United States Patent [19]

Saunders

[11] Patent Number: 5,635,705
[45] Date of Patent: Jun. 3, 1997

[54] SENSING AND SELECTING OBSERVED EVENTS FOR SIGNAL PROCESSING

[75] Inventor: Christ H. Saunders, Laguna Niguel, Calif.

[73] Assignee: Irvine Sensors Corporation, Costa Mesa, Calif.

[21] Appl. No.: 526,415

[22] Filed: Sep. 11, 1995

[51] Int. Cl.[6] .................................................. H01J 40/14
[52] U.S. Cl. .......................... 250/214 RC; 250/208.1; 348/61
[58] Field of Search ................ 250/214 R, 214 RC, 250/214 C, 214 B, 214 DC, 208.1; 327/99, 170, 361; 348/135, 129, 164, 166, 61

[56] References Cited

U.S. PATENT DOCUMENTS 5,057,820  10/1991  Markson et al. .................... 340/600
5,130,578  7/1992  Stone et al. ........................ 307/494

Primary Examiner—Edward P. Westin
Assistant Examiner—Alan L. Giles
Attorney, Agent, or Firm—Thomas J. Plante

[57] ABSTRACT

Circuitry for sensing a relatively large number of events, and outputting to processing circuitry only those events which have two characteristics: (1) a magnitude above a preselected threshold level, and (2) a rate of change greater than a preselected background rate of change. Logic circuitry is used to assign any event which has the desired characteristics to an available output channel. Subtracter circuitry causes the background to be subtracted from the sensing input, in order to limit the output to non-background events.

23 Claims, 6 Drawing Sheets

SENSING AND SELECTING OBSERVED EVENTS FOR SIGNAL PROCESSING

This invention was made with Government support under Contract NAS8-39845 awarded by the National Aeronautics and Space Administration, Marshall Space Flight Center, Ala. The Government has certain rights in the invention.

BACKGROUND OF THE INVENTION

This invention relates to electronic systems which receive data via channels of sensing circuitry and cause such data to be subsequently processed to provide desired information.

Such systems for receiving and processing information may combine a sensing portion having space and/or power limits, with a remote processing portion communicating with the sensing portion. For example, the sensing portion may be onboard an aircraft or satellite, while the processing portion may be on the ground, where power and space are not significantly limited.

Some of the work leading to the present invention was motivated by a program to detect lightning pulses, which may predict the occurrence of tornadoes. Other event (i.e., random event) detection systems might be used to watch for nuclear events, or to observe moving objects. Numerous uses are possible in commercial situations, such as observation of manufacturing processes in order to sense the occurrence of certain random events, after which the data on such events is fed to a control computer to provide process information and control.

A primary problem in such a signal sensing and signal processing system is that it may have many parallel sensing inputs, and only a few output channels leading to the processing electronics. For example, an IC chip might have 64 input channels and 4 output channels, a ratio of 16. The ratio might be pushed substantially higher. If a focal plane 3D stack of IC chips is used, such as the stack described in common assignee U.S. Pat. No. 4,551,629, the total number of input channels might be 64×64 (4,096); and the total number of output channels might be 64×4 (256).

Heretofore, input signals from high density sensing structures have been transferred to the processing circuitry by means of conventional multiplexers. A conventional time division multiplexer receives the parallel input signals, and, based on clock intervals, sends them serially in a predetermined order to an output channel. The maximum available bandwidth is a function of the time required for all the sensing channels to be sampled via the multiplexer output channel to which their signals are directed. In the example of 16 sensing channels for each multiplexer output channel, the bandwidth would be 1/16 of the clock frequency.

An important purpose of the present invention is to significantly enhance available bandwidth in a signal sensing and switching system. A related purpose is to improve the ability of such a system to separate signals of interest from undesired background signals, thereby increasing dynamic range.

SUMMARY OF THE INVENTION

The present invention provides event-driven means for selecting incoming signals. Only signals which meet predetermined requirements are passed on through the switching system to the processing circuitry. For example, the amplitude of a sensed signal may be greater than a certain threshold value, as determined by a comparator. Such a signal will be passed through, while other signals are blocked.

In a system having many parallel photo-detector signals, each representing a single pixel, an amplifier and comparator are dedicated to each pixel. The comparator receives a first input from the pixel photo-detector, and a second input having a predetermined threshold amplitude. That amplitude is chosen to obtain maximum efficiency of the system, without sacrificing its ability to process those events which are of interest.

Each event which is above threshold is input to a logic system which causes the selected event signal to connect to an open output channel, leading to processing circuitry. The number of output channels, and the threshold event value, are chosen to obtain processing of substantially all signals of interest. In other words, there should be an available output channel when each event of interest is sensed.

The events which are considered significant are, in effect, pulses, each of which indicates a minimum rate-of-change in the scene observed by the pixel. Background information is not relevant, whether it is essentially unchanging, or is changing slowly, e.g., moving clouds. Because each comparator is comparing the pixel signal amplitude with the threshold amplitude, it is desirable to essentially eliminate background values from the pixel-to-comparator input.

Background information in the present invention is removed by a subtraction process, rather than a filter which blocks certain frequencies. The pixel-dedicated subtracter circuit, which has several advantages over the customary high frequency bandpass filter, receives the sensed inputs of the pixel background, e.g., clouds, excessive brightness, etc., and subtracts the background input value from the input value. This may be accomplished either by current subtraction or by voltage subtraction.

DETAILED DESCRIPTION OF SPECIFIC EMBODIMENTS

Figure 1:
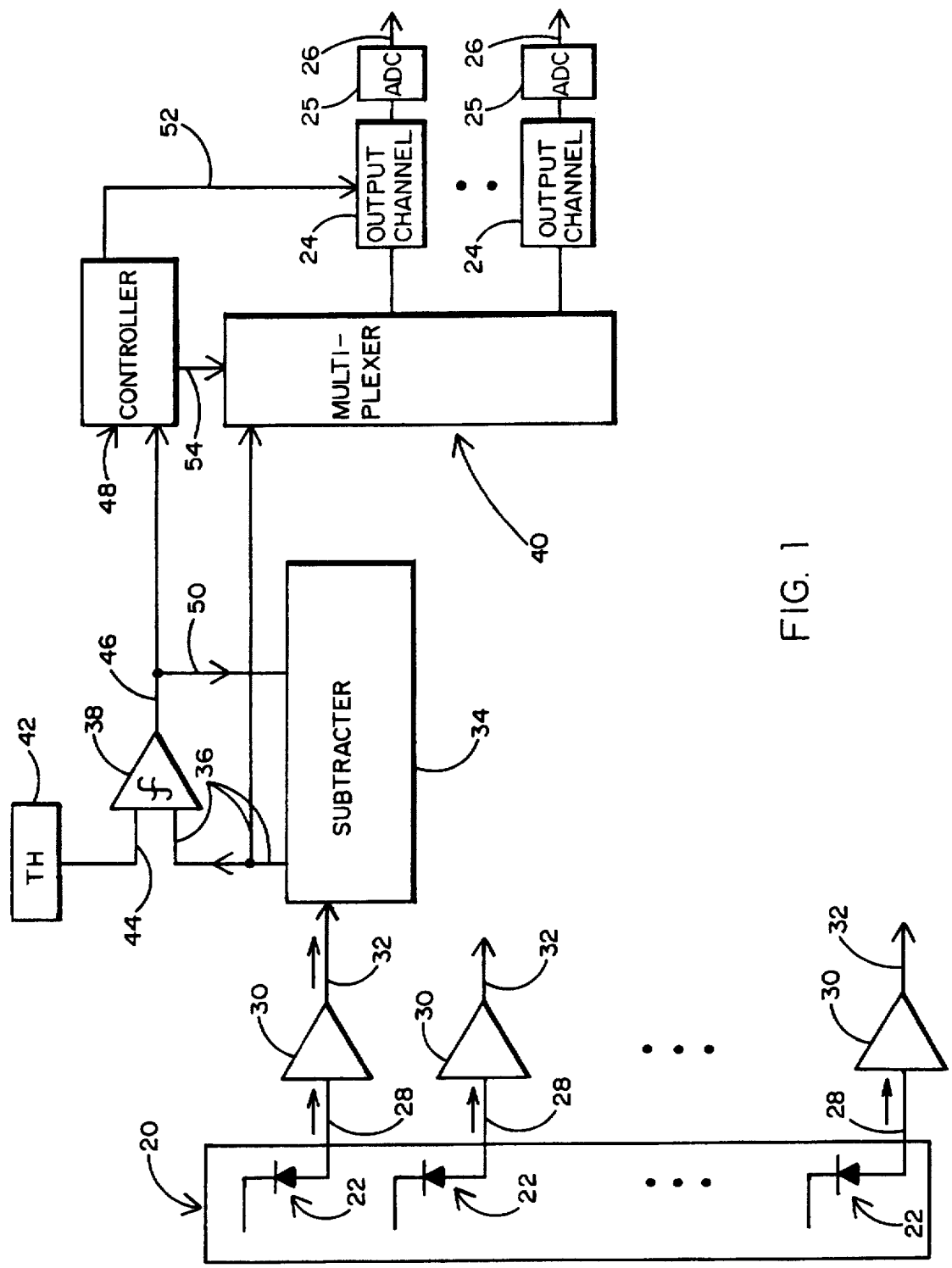
FIG. 1 is a block diagram showing the system circuitry on a single IC chip.

The circuitry shown in FIG. 1 is preferably integrated circuitry provided on a single IC chip. In the figure, numerous input sensing lines are located at the left, and a few processing channel outputs are located the right. Block 20 represents the parallel input lines, each of which begins with a sensor, e.g., a photodiode 22. At the output side, a plurality of parallel channels 24 are provided, each having an output line 26 leading to off-chip processing circuitry.

As stated above, one possible embodiment of the invention has 64 input signals and 4 output channels. The choice of the number of input lines and the number of output channels may be varied over a wide range. The ratio of input to output channels is selected to provide maximum bandwidth in the system without sacrificing any of the relevant input signals. The sensing inputs are not limited to light sensors (visible or infrared). Any pulse counting requirements would benefit from this circuitry.

Each photodetector 22 outputs a current on its line 28, which is input to its transimpedance amplifier 30. The output of each amplifier 30 is on its line 32.

A block 34 represents a background subtracter circuit, the purpose of which is to continuously subtract the background signal from the input current on line 32, thereby greatly enhancing the dynamic range of the system. In other words, the signals of interest, i.e., the pulses representing significant events, are the only processed signals. The subtracter circuit incorporates capacitors to separate slow-changing background signals from more rapidly-changing pulse inputs.

Each input channel has its own (dedicated) subtracter circuit. The signal on line 32 enters the subtracter circuit. A modified signal from the subtracter exits on line 36. Line 36 leads to one input of a comparator 38 and also to a multiplexer represented by block 40. The signals on line 36 may be either current or voltage.

The purpose of comparator 38 is to select only those input signals which reach a certain threshold magnitude. Block 42 represents an amplitude-setting source, which provides a predetermined value on line 44 at the second input of the comparator 38.

Whenever comparator 38 receives on line 36 a signal greater than the threshold signal on line 44, the comparator outputs a digital signal on line 46 to a logic controller 48, which causes the logic controller and multiplexer to connect that input channel to one of the output processor channels.

At the same time, line 36 carries the analog signal directly to the multiplexer, or switching device, 40, where it is available for connecting to any available output channel 24, under the control of logic circuitry 48.

Line 50 represents a feedback from the comparator output line 46 to the subtracter circuit 34, which causes any digital output pulse from the comparator to turn off the subtracter circuit. This permits the input channel to store (freeze) the magnitude of the unwanted (background) signal, which allows the low frequency component of the input pulse to be sampled at the output channel.

Line 52 represents a connection between the controller 48 and each output channel 24. Because controller 48 is responsible for assigning an available output channel to receive an analog signal from a given input line, the controller is aware (knows) whether any output channel is available for monitoring the events on an input line. Line 54 connects controller 48 to the multiplexer 40. Encoded line identification is included, telling which line is the source of a given pulse.

As shown in FIG. 1, each output channel 24 may include an analog-to-digital converter 25, so that the efficiency of digital signal transmission may enhance the external signal processing function.

Figure 2:
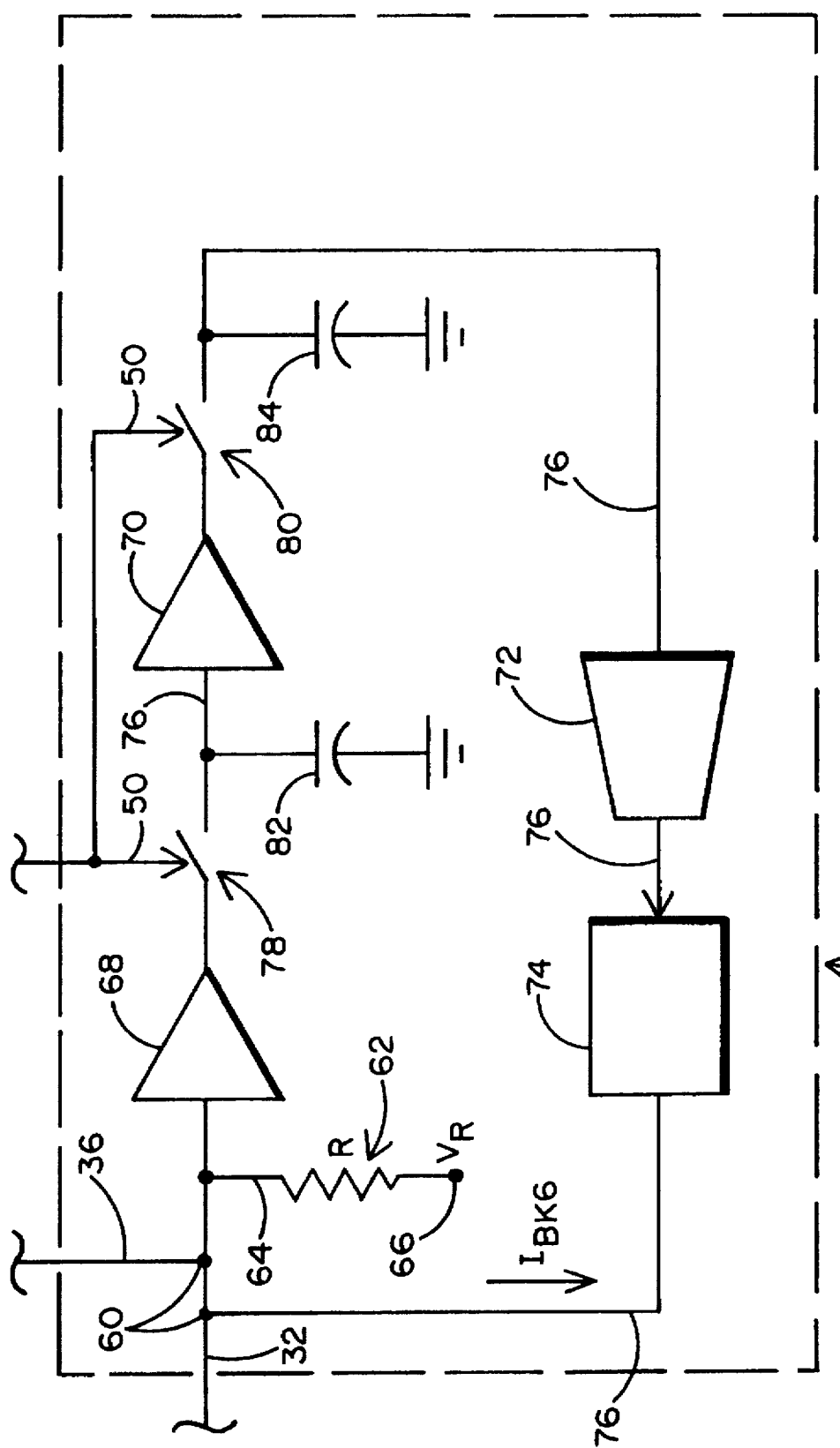
FIG. 2 is a schematic showing the subtracter circuitry of FIG. 1.

FIG. 2 shows components of the subtracter 34; a tracking integrator which continuously subtracts the unwanted background current in dynamic fashion. The subtracter circuitry ignores the faster signal pulses which are passed on to the processor. The input analog current on line 32 includes a slowly varying background signal that can be much larger than the level of the signal event which must be detected.

As previously stated, each input channel contains a subtracter circuit. Line 32 carries the output current from high impedance amplifier 30. This current may be converted to a voltage signal at node 60, by means of a resistance 62 located in a line 64 between the incoming signal and a reference voltage at 66, the value of which is above ground, e.g., 1.5 volts.

The circuitry of subtracter 34 is shown as including four amplifiers, 68, 70, 72, and 74, which are connected in series on line 76. The current on line 76 has polarity opposite from that of the current on line 64. The result is that the background signal is subtracted from the input signal, causing essentially zero net output at node 60, until a pulse occurs.

The subtracter 34 includes two normally closed switches 78 and 80, e.g., mosfet transistors. It also includes two capacitors 82 and 84, connected between the subtracter line 76 and a reference voltage. As long as the input remains below a certain rate of change, no substantial signal will appear on line 36 at the comparator input. If a pulse of interest occurs, its transmission on the subtracter circuit will be slowed by capacitors 82 and 84, thereby permitting a pulse input signal to reach the comparator.

If the comparator input signal on line 36 exceeds the threshold value on line 44 (see FIG. 1), an output signal will be sent by the comparator along line 46 to the logic controller 48. The comparator output signal will also enter the subtracter circuit via line 50, causing switches 78 and 80 to open. The effect is to store the voltage on capacitors 82 and 84, thereby maintaining the existing background signal value for the duration of the pulse. The background value continues to be subtracted from the input signal, and therefore the voltage at node 60 consists only of the wanted temporal pulse.

Figure 3A:
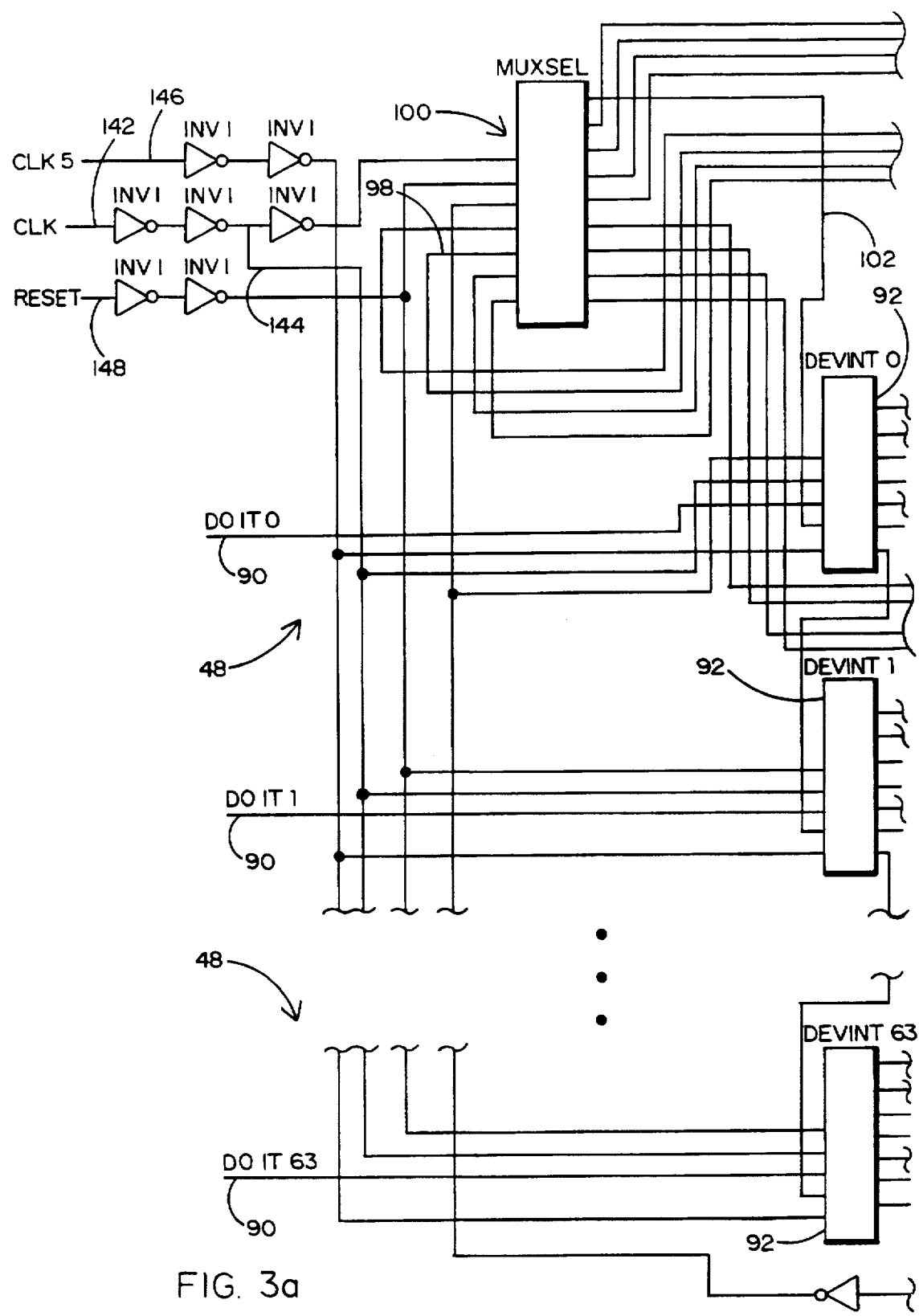
FIGS. 3a and 3b combine to provide a schematic showing the logic circuitry of FIG. 1.
Figure 3B:
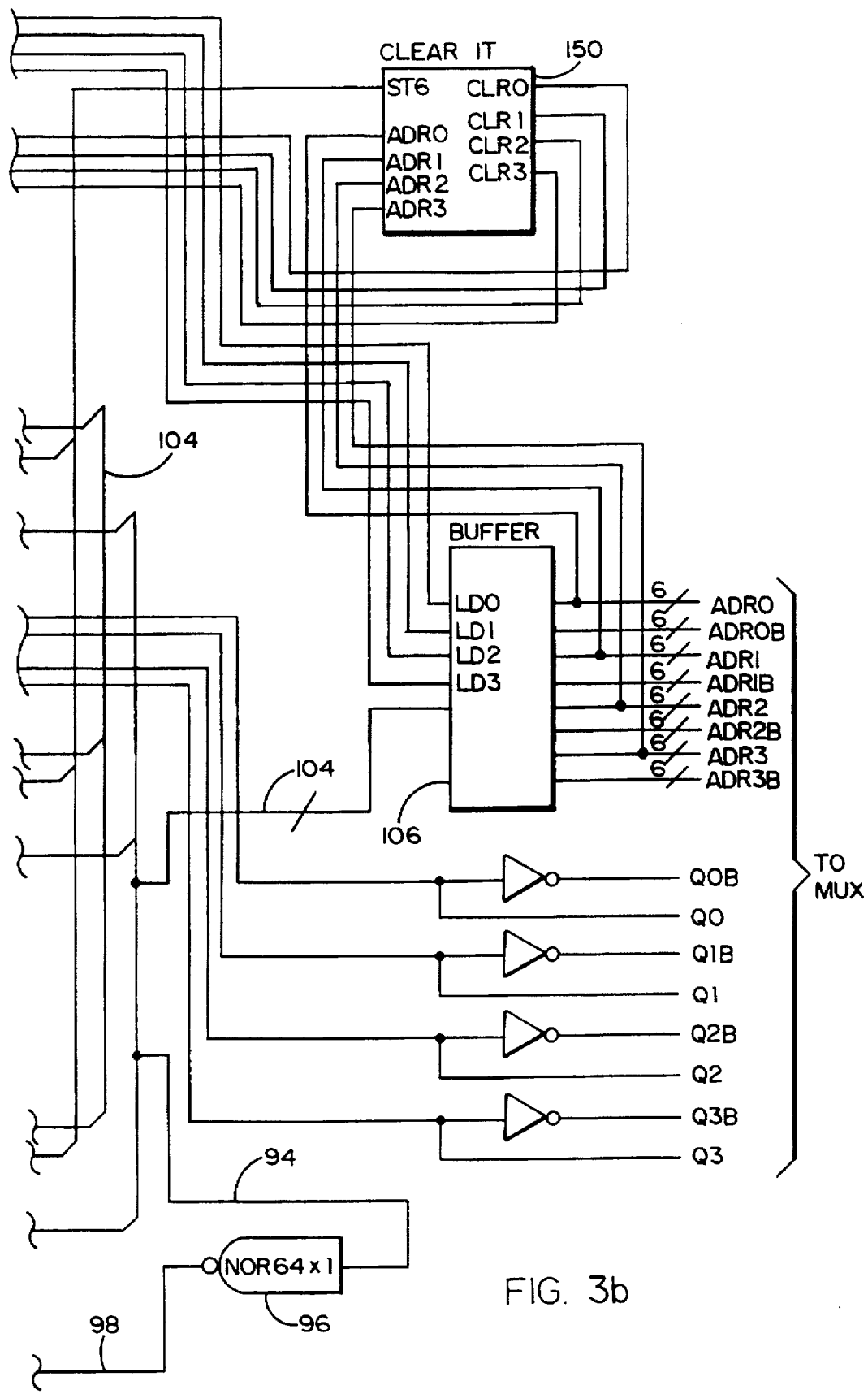
Figure 4:
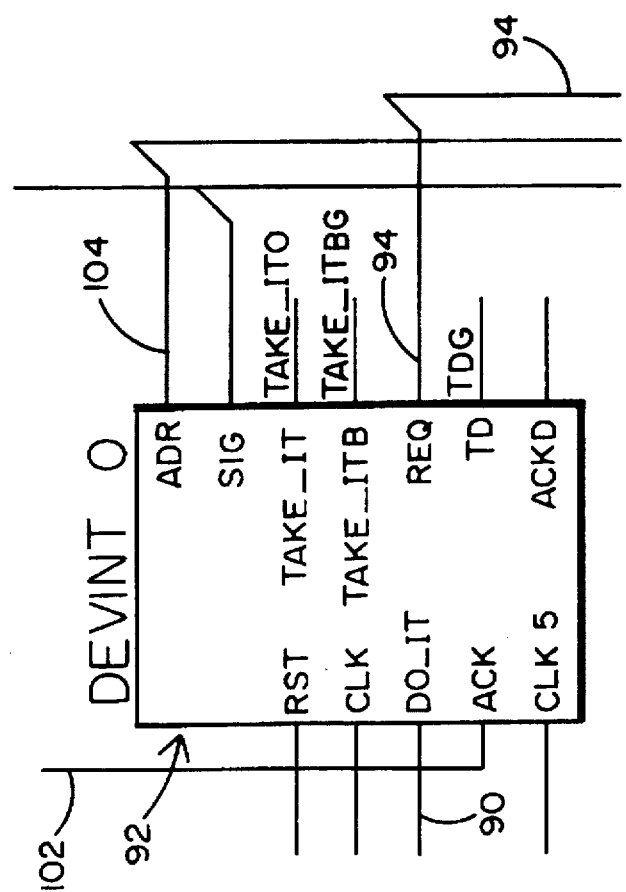
FIG. 4 is a closeup of one component of FIG. 3.

FIG. 3 shows components of the logic controller circuitry 48, which causes event-driven switching between the sensor input channels and the output processor channels. The input from each comparator 38 on line 46 is available on line 90, called the Do-It line. An input signal from any of the input comparators may enter the logic controller 48. If there are 64 input channels, there will be 64 Do-It lines 90. Each of them connects to one of 64 Devints (device interface circuits) 92. FIG. 4 is an enlargement of a single Devint 92.

Figure 5:
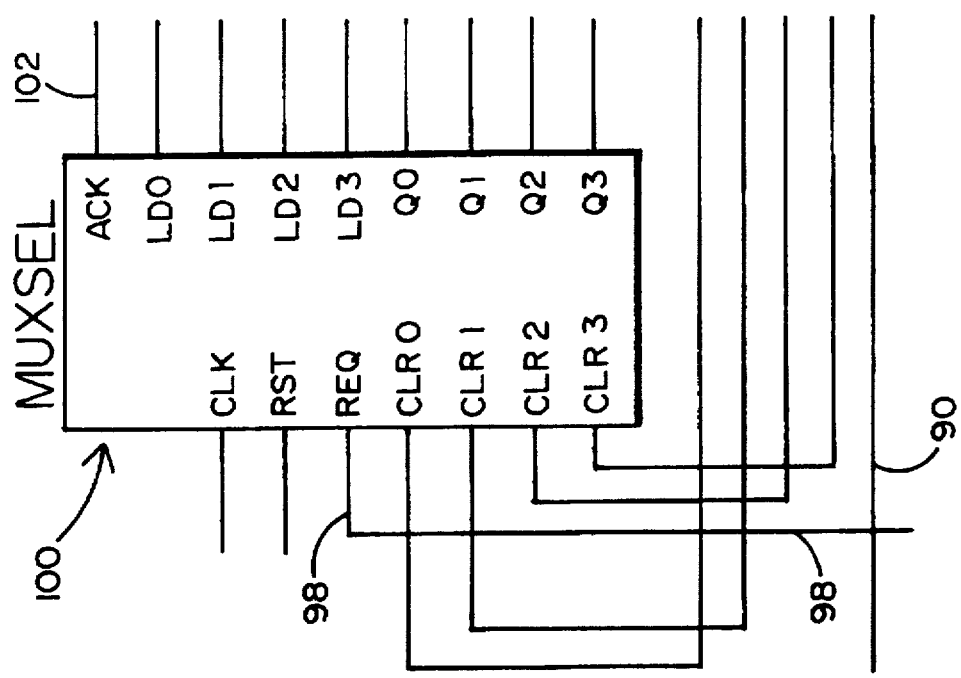
FIG. 5 is a closeup of another component of FIG. 3.

Each Devint 92 is able to send a request on its line 94 to ask for an available output channel. All 64 of the request lines 94 feed into a wired NOR gate 96 (which is shown as 64 to 1, i.e., 64 inputs and 1 output). A single request line 98 connects the gate 96 to a request port on a Muxsel (multiplexer selector) 100, which is responsible for directing an incoming signal to any one of the output channels 26 which may be open at the time (see FIG. 1). FIG. 5 is an enlargement of the Muxsel 100.

In the present example, four output channels are used. Allocation of the output channels is controlled by the Muxsel 100, which is aware of output channel availability. Muxsel 100 has an ACK line 102 which connects serially to the Devints 92, for the purpose of sending an acknowledgment signal, if there is an available output channel. When the Devint which asked for an output channel receives such an acknowledgment, it sends out an address via line 104 to an address buffer 106.

Figure 6:
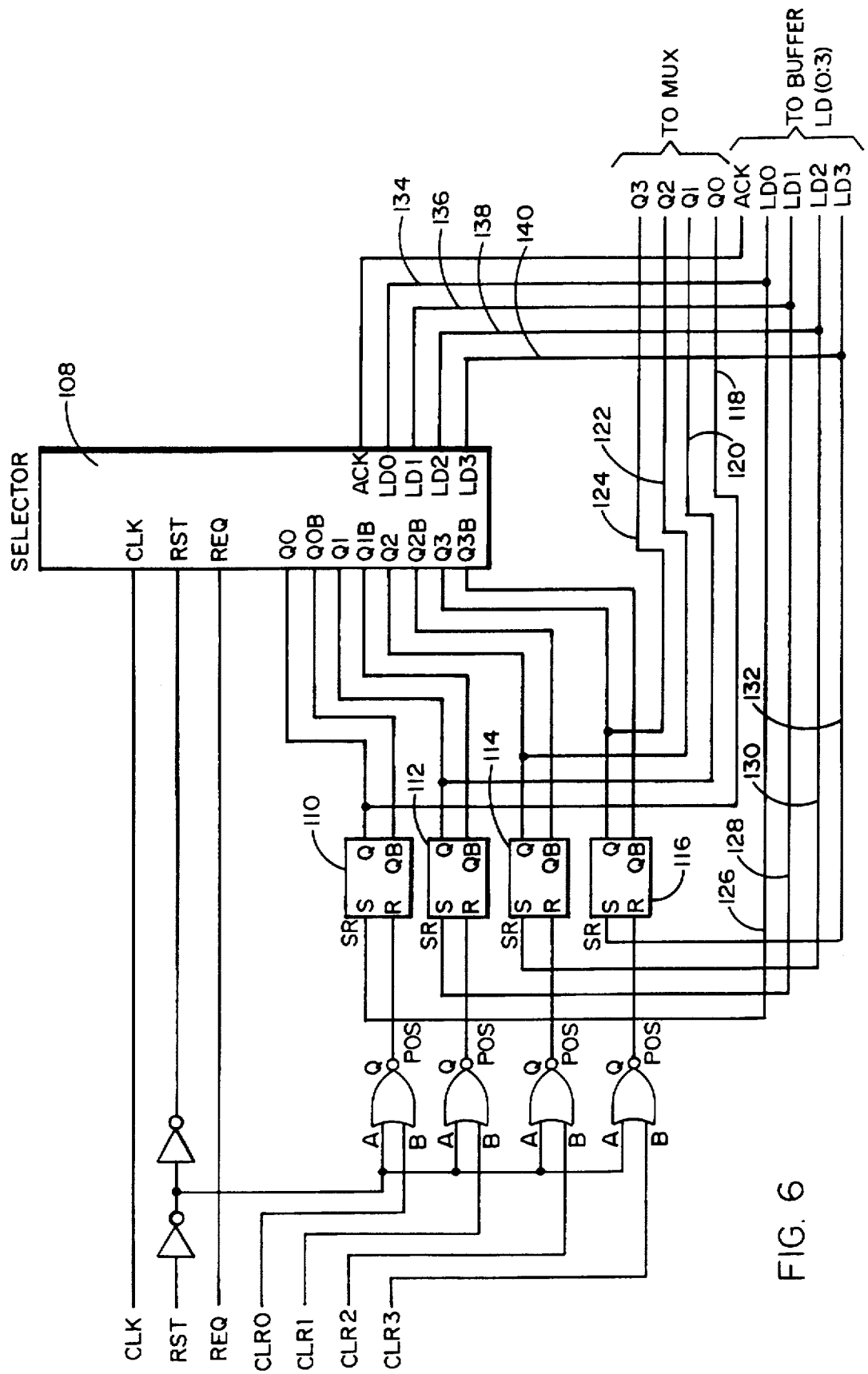
FIG. 6 is a schematic showing details of the component shown in FIG. 5.

FIG. 6 shows components of Muxsel 100, including a selector unit 108, and four shift registers (SR) 110, 112, 114, and 116. Each shift register controls and represents one of the four output channels. Each shift register is shown as having two lines connecting to selector 108, representing the non-inverted and inverted signals which control the respective output channels, 0, 1, 2, and 3. Line 118 leads from SR 110 to the multiplexer, line 120 leads from SR 112 to the multiplexer, line 122 leads from SR 114 to the multiplexer, and line 124 leads from SR 116 to the multiplexer. Line 126 connects SR 110 to the buffer, line 128 connects SR 112 to the buffer, line 130 connects SR 114 to the buffer, and line 132 connects SR 116 to the buffer. Line 134 connects port LD0 of the selector 108 to line 126, line 136 connects port LD1 of selector 108 to line 128, line 138 connects port LD2 of selector 108 to line 130, and line 140 connects port LD3 of selector 108 to line 132.

FIG. 3 shows four address control ports, LD0, LD1, LD2, and LD3, of Muxsel 100 connected, respectively, to four input ports, LD0, LD1, LD2, and LD3, of buffer 106. Buffer 106 is shown having output address signals ADR0, ADR0B, ADR1, ADR1B, ADR2, ADR2B, ADR3, and ADR3B, which determine the addresses to which individual signals are sent.

Muxsel 100 has four output ports, Q0, Q1, Q2, and Q3 which control changing of the status of the four output channels, i.e., they activate each channel which is being addressed. Lines Q0, Q0B, Q1, Q1B, Q2, Q2B, Q3, and Q3B are shown in the figure.

Timing control lines are shown in the upper left corner of FIG. 3. Clock line 142 is connected to Muxsel 100, and its branch line 144 is connected to each of the 64 Devints 92. Clock line 146 is connected to each of the 64 Devints 92. Reset line 148 is connected to Muxsel 100, and to each of the 64 Devints 92. The timing arrangement is such that each signal which is passed through to one of the output channels is clocked out after 5 clock counts.

A Clear-It unit 150 receives inputs at ADR0, ADR1, ADR2, and ADR3 from the address signals of buffer 106. And the Clear-It unit 150 sends signals on lines CLR0, CLR1, CLR2 and CLR3 to the similarly designated input ports of Muxsel 100, in order to clear the respective shift registers, 110, 112, 114, 116, of Muxsel 100 (see FIG. 6).

From the foregoing description, it will be apparent that the apparatus and method disclosed in this application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed is:

1. Circuitry for signal sensing and processing comprising:
   a plurality of parallel input sensing lines, each of which carries an electronic analog signal from a different portion of an observed area;
   a plurality of output channels each available to send an electronic signal from the sensing circuitry for further processing, provided that channel is then open;
   a comparator associated with each input sensing line which outputs a logic pulse whenever the signal entering the input line exceeds a predetermined threshold value; and
   logic circuitry which responds to a logic pulse from the comparator and directs the signal, which caused that logic pulse, to be switched onto a then open output channel.

2. The circuitry of claim 1 in which each parallel input line carries an electronic signal caused by a photodetector receiving input from an individual pixel.

3. The circuitry of claim 2 which also comprises:
   subtracter circuitry in each input sensing line which causes the background signal value to be subtracted from the total signal value, in order to limit the comparator input signals to those having a greater than background rate of change.

4. The circuitry of claim 3 in which the subtracter circuit includes one or more capacitors whose charging time determines the rate of signal change needed to send a comparator output pulse.

5. The circuitry of claim 3 which also comprises:
   a feedback from the comparator output to the subtracter which causes the subtracter to maintain the existing background signal value when the comparator outputs a pulse.

6. The circuitry of claim 1 in which the logic circuitry includes:
   circuitry which allocates input sensing signals to the output channels based on its storage of information indicating whether a given output channel is open.

7. The circuitry of claim 1 in which the number of input sensing lines is substantially greater than the number of output channels.

8. The circuitry of claim 7 which also comprises:
   an analog-to-digital converter in each output channel.

9. The circuitry of claim 1 in which the logic circuitry includes:
   an output channel selector which assigns an open output channel to receive the signal from any input sensing line which exceeds the predetermined threshold value.

10. The circuitry of claim 9 in which the logic circuitry includes:
    circuitry associated with each input sensing line which sends any signal received on that line to the output channel selector.

11. The circuitry of claim 9 in which the output channels simultaneously transmit a plurality of signals selected from input sensing lines because such signals are above the threshold value.

12. The electronic circuitry of claim 1 which also includes:
    an analog to digital converter in each output channel.

13. The circuitry of claim 1 in which the output channels simultaneously transmit a plurality of signals selected from input sensing lines because such signals are above the threshold value.

14. Circuitry for signal sensing and processing comprising:
    a plurality of parallel input sensing lines, each of which carries an electronic amplitude signal from a different portion of an observed area;
    a plurality of output channels available to send electronic signals from the sensing circuitry for further processing;
    a subtracter associated with each input sensing line which subtracts background signal values from the input values on the sensing line, and which outputs a signal if the rate of change of the input signal value exceeds a predetermined background rate of signal change;
    a comparator associated with each input sensing line having one input from the subtracter output and the other input from an amplitude threshold source;
    said comparator providing a digital output whenever input from the subtracter exceeds input from the threshold source;
    logic circuitry which responds to a digital output from the comparator;
    a line leading from each subtracter to the logic circuitry in order to transmit any port-subtracter output signal;
    said logic circuitry including circuitry which connects the port-subtracter output signal to any available output channel when it receives a digital output signal from the comparator.

15. The circuitry of claim 14 in which the logic circuitry includes:
    an output channel selector which assigns an available output channel to receive the amplitude signal from any port-subtracter output.

16. The circuitry of claim 15 in which the logic circuitry includes:

a device associated with each input sensing line which sends any port-subtracter output signal on that line to the output channel selector.

17. The electronic circuitry of claim 14 which also includes:

an analog to digital converter in each output channel.

18. The circuitry of claim 14 in which the output channels simultaneously transmit a plurality of signals selected from input sensing lines because such signals are above the amplitude of the threshold source.

19. The circuitry of claim 14 which also comprises:

a feedback from the comparator output to the subtracter which causes the subtracter to maintain the existing background signal value during transmission of a post-subtracter output signal to an output channel.

20. The method of sensing and processing signals produced by sensor observed events, comprising:

sensing on parallel lines a plurality of signals representing different parts of an area;

comparing signals on each parallel line with a predetermined threshold amplitude value;

causing each sensed event which exceeds the amplitude value to pass through to an output channel selection logic; and assigning each such passed through sensed event to one of a plurality of output channels, substantially fewer than the number of parallel sensing lines.

21. The method of claim 20 in which the output channels simultaneously transmit a plurality of signals selected from the sensed signals because such signals are above the threshold amplitude.

22. The method of claim 20 which includes the step of:

subtracting background signal values from the signals on each parallel line, so that only signals having a greater than background rate of change are available for passing through to an output channel.

23. The method of claim 22 which also comprises:

causing the existing subtracted background signal value to be maintained during pass through of a sensed event to an output channel.

* * * * *

UNITED STATES PATENT AND TRADEMARK OFFICE
CERTIFICATE OF CORRECTION

PATENT NO. : 5,635,705
DATED : June 3, 1997
INVENTOR(S) : Christ H. Saunders

It is certified that error appears in the above-identified patent and that said Letters Patent is hereby corrected as shown below:

Column 6, line 56 (Claim 14): Change "port-subtracter" to
-- post-subtracter --.

Column 6, line 58 (Claim 14): Change "port-subtracter" to
-- post-subtracter --.

Column 6, line 65 (Claim 15): Change "port-subtracter" to
-- post-subtracter --.

Column 7, line 2 (Claim 16): Change "port-subtracter" to
-- post-subtracter --.

Signed and Sealed this

Sixteenth Day of September, 1997

Attest:

BRUCE LEHMAN

*Attesting Officer*    *Commissioner of Patents and Trademarks*